June 21, 1932. G. A. COMBRIDGE 1,863,684
INDICATOR
Filed July 17, 1931
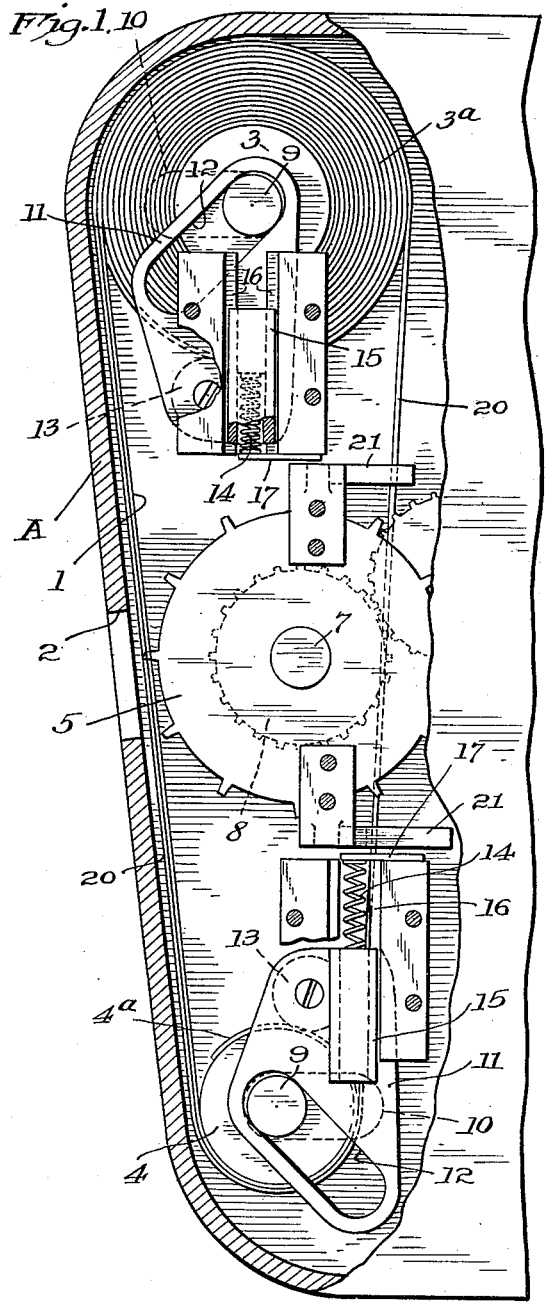
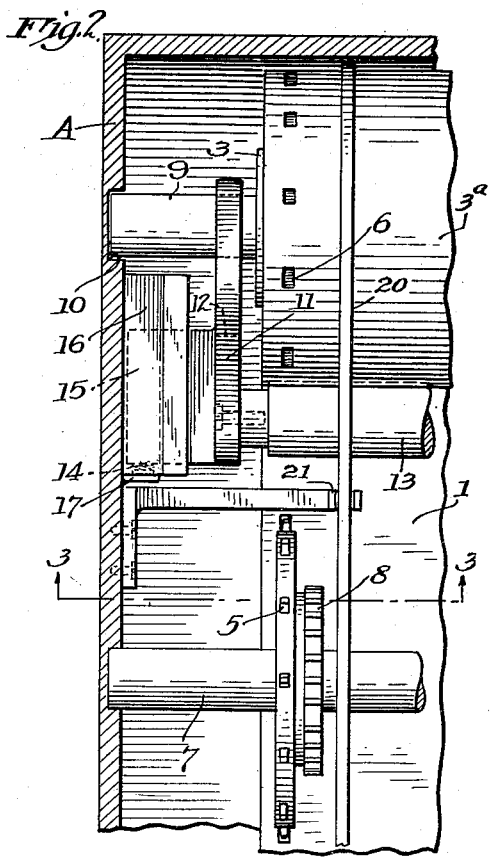
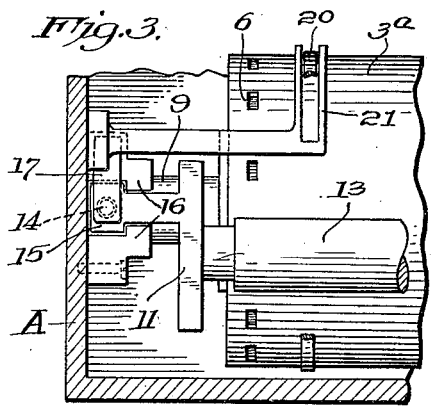
INVENTOR.
George A. Combridge,
BY
ATTORNEY.

Patented June 21, 1932

1,863,684

UNITED STATES PATENT OFFICE

GEORGE A. COMBRIDGE, OF SAN FRANCISCO, CALIFORNIA

INDICATOR

Application filed July 17, 1931. Serial No. 551,400.

This invention is an indicator of that type in which a flexible tape carrying display matter is shifted relative to a sight opening by unwinding the tape from one roller and winding the same onto a cooperating roller, the invention being particularly applicable to a station indicator for a conveyance wherein the flexible tape carries the names of the successive stations and is adapted for step-by-step shifting to successively indicate the various stops.

It is the object of the invention to mount the rollers for the flexible tape so that as the diameters of the rolls of tape respectively decrease and increase responsive to the tape being wound from one roller to the other, the said rollers are correspondingly shifted for maintaining the stretch of tape between the rolls in the same relative position at all times, thereby insuring the tape being properly displayed at the sight opening and also insuring a suitable drive mechanism maintaining its operative engagement with the tape.

It is a further object of the invention to thus shift the rollers for maintaining proper alinement of the tape, by extremely simple and automatic means comprising elements adapted for movement in accordance with the varying diameters of the respective rolls of tape, and adapted by their movement to correspondingly shift the respective rollers with relation to the casing in which the rollers are journaled.

It is a still further object of the invention to provide extremely simple but practical means for rotating the take-up roller by rotation of the cooperating roller from which the tape is being unwound, with said rotation of the rollers automatically varying in accordance with the varying diameters of the respective rolls of tape, so that the take-up roller is turned just the proper distance to wind up that length of tape which is unwound from the cooperating roll, irrespective of the varying difference in diameter of the respective rolls.

Further objects of the invention will be readily understood from the following description of the accompanying drawing, in which:

Fig. 1 is an end elevation of the indicator with its casing broken away.

Fig. 2 is a fragmentary rear elevation of the indicator with its casing broken away.

Fig. 3 is a horizontal section on the line 3—3 of Fig. 2.

The indicator is housed in a suitable casing A, which in the drawing is broken away to show one unit of the indicator adapted to display a flexible tape 1 at a sight opening 2. The ends of the tape are wound upon rollers 3—4 as shown at $3^a$—$4^a$, with the rollers journaled in the casing above and below the sight opening so that as the tape is unwound from one roller and rolled up on the other it moves past the sight opening for successively exhibiting the display matter carried by the tape and which may comprise the names of the successive stations along the route of a conveyance.

The tape may be shifted step-by-step by a sprocket 5 engaging a notched edge 6 of the tape, the sprocket being shown as fixed on a shaft 7 which is journaled in the casing so that the sprocket engages the tape midway between the rollers 3—4, and the shaft 7 is rotated in any suitable manner, as for example by a train of gears, one of which is shown at 8, actuated by any suitable drive mechanism (not shown) and including any suitable control means for intermittently rotating the shaft.

As the tape is unwound from one roller and correspondingly wound up on the other, the diameters of the rolls of tape will continuously vary; and in order that the stretch of tape between the cooperating rolls may maintain the same position with relation to both sight opening 2 and sprockets, the journals 9 of rollers 3—4 are preferably received in slotted bearings 10 formed in the side walls of casing A, with said slotted bearing so disposed that shifting of the journals in said slots moves the rollers 3—4 toward and away from the front wall of casing A in which the sight opening 2 is formed. The tape may thus be maintained parallel to the front wall of the casing by forwardly shifting the roller from which the tape is being unwound and rearwardly shifting the cooperating take-up roller, with said shifting of the rollers controlled by the varying diameters of the respective rolls of tape. By thus maintaining the tape parallel to the front wall of casing A, the display matter on the tape is always readily readable through sight opening 2, and maintaining the tape in the same plane also insures the sprocket 5 properly engaging the notches 6 for operatively shifting the tape.

The rolls of tape are adapted for automatic shifting in slotted bearings 10, and for this purpose plates 11 are adapted to slide perpendicularly to the lengths of the slotted bearings in accordance with the varying diameters of rolls 3ª—4ª, with the journals 9 extending through slots 12 in the sliding plates, and said slots angularly disposed so that as the diameter of either roll 3ª or 4ª decreases, and its sliding plate is correspondingly shifted toward the axis of said roll, the angularly disposed slot of the sliding plate will correspondingly shift the roll along its slotted bearing and toward the front wall of casing A as shown at roller 4 in Fig. 1, and as the diameter of the other roll increases, and its sliding plate is correspondingly shifted away from the axis of the roll, the angularly disposed slot in said sliding plate correspondingly shifts the roll away from the front wall of casing A as shown at roller 3 in Fig. 1.

The engagement between plates 11 and the respective rolls 3ª—4ª, preferably comprises a roller 13 journaled on each plate and contacting the cooperating roll of tape, with the increasing diameter of the roll of tape pressing against roller 13 so as to shift plate 11 away from the axis of the roll, and a suitable spring 14 tending to yieldably oppositely shift the plate 11 toward the axis of its roll. The plate 11 may be slidably mounted with relation to its roll of tape by mounting a head 15 of the plate in a guide bearing 16 which may be fixed to the side wall of casing A; and the spring 14 may be a coil spring mounted in head 15, with an abutment 17 carried by the guide bearing and overlying the end of the spring so that shifting of plate 11 away from the axis of its roll compresses the spring so as to oppositely shift the plate when the diameter of the roll starts to decrease.

The sprocket 5 by shifting the tape rotates the roller from which the tape is being unwound, and the cooperating take-up roller is thereby rotated for winding up the tape, as for example by an endless belt 20; but since the diameters of the respective rolls are not the same, the driving connection 20 must provide for turning the take-up roller a different rotary distance from that of the roller from which the tape is being unwound, so as to take up just that amount of tape which is unwound at each step-by-step movement of the drive sprocket. For this purpose the belt 20 is preferably of resilient material such as rubber, and is looped around the rolls 3ª—4ª for expansion and contraction as the rollers are shifted in their slotted bearings, so as to maintain a frictional driving connection between the rolls of tape. It will thus be seen that as the tape is unwound from one roller, roller 3 for example, the belt 20 is shifted in accordance with the unwinding of the tape from roll 3ª, and by engaging roll 4ª rotates its roller 4 just the proper distance to take up the amount of tape which is unwound from roll 3ª, irrespective of the difference in diameter of the respective rolls.

The belt 20 may be held against movement longitudinally of rollers 3—4, by suitable guides 21, adjacent the respective rollers and engaging the stretch of belt at the rear of the indicator, the guides being shown as forked elements adapted to straddle the drive belt and suitably mounted on casing A, with the guide slots of sufficient depth to engage the belt 20 when the rollers 3—4 are shifted either forwardly or rearwardly in their slotted bearings 10, and when rolls of tape 3ª—4ª are of either maximum or minimum diameter.

The invention thus provides an extremely practical mounting for the winding rollers of a movable display tape, adapted for automatic shifting of the rollers relative to the sight opening and the drive sprocket of the apparatus, so as to maintain the same alinement of the tape as the diameters of the rolls respectively increase and decrease, and also rotating the take-up roller so as to wind up just that amount of tape which is unwound from the cooperating roll, irrespective of the difference in diameter of the respective rolls.

I claim:

1. In combination, a pair of rollers, a tape having its end wound upon the respective rollers and adapted to unwind from one roller and wind upon the cooperating roller, thereby varying the diameters of the respective rolls of tape, slotted bearings for the rollers, plates slidable perpendicularly to the lengths of the slotted bearings, and rollers on said plates contacting the cooperating rolls of tape for sliding said plates in accordance with said variations in the diameters of the respective rolls of tape, the plates having angularly disposed slots engaging the cooperating rollers for correspondingly relatively shifting the rollers in their slotted bearings in accordance with sliding movement of the plates so as to uniformly maintain the position of the length of tape which extends from one roll to the other.

2. In combination, a pair of rollers, a tape having its end wound upon the respective rollers and adapted to unwind from one roller and wind upon the cooperating roller, thereby varying the diameters of the respective rolls of tape, plates slidable radially of the rollers, and means for yieldably projecting the plates toward the axes of the rollers, said plates engaging the respective rolls of tape for sliding said plates in accordance with said variations in the diameters of the respective rolls of tape, and said plates engaging the rollers for correspondingly relatively shifting the rollers so as to uniformly maintain the position of the length of tape which extends from one roll to the other.

3. In combination, a pair of rollers, a tape having its end wound upon the respective rollers and adapted to unwind from one roller and wind upon the cooperating roller, thereby varying the diameters of the respective rolls of tape, slotted bearings for the rollers, plates slidable perpendicularly to the lengths of the slotted bearings, means for yieldably projecting the plates toward the slotted bearings, and rollers on said plates contacting the cooperating rolls of tape for sliding said plates in accordance with said variations in the diameters of the respective rolls of tape, the plates having angularly disposed slots engaging the cooperating rollers for correspondingly relatively shifting the rollers in their slotted bearings in accordance with sliding movement of the plates so as to uniformly maintain the position of the length of tape which extends from one roll to the other.

4. In combination, a pair of rollers, a tape having its end wound upon the respective rollers and adapted to unwind from one roller and wind upon the cooperating roller, thereby varying the diameters of the respective rolls of tape, drive mechanism engaging the length of tape which extends from one roll to the other, and means for relatively shifting the rollers in accordance with said variations in the diameters of the respective rolls of tape so as to uniformly maintain the portion of the length of tape which is engaged by the drive mechanism.

5. In combination, a pair of rollers, a tape having its end wound upon the respective rollers and adapted to unwind from one roller and wind upon the cooperating roller, thereby varying the diameters of the respective rolls of tape, drive mechanism engaging the length of tape which extends from one roll to the other, an endless driving connection looped around the cooperating rolls of tape, and guide means for the driving connection holding the same against displacement longitudinally of the rollers.

In testimony whereof I have affixed my signature.

GEORGE A. COMBRIDGE.